Figure 5:
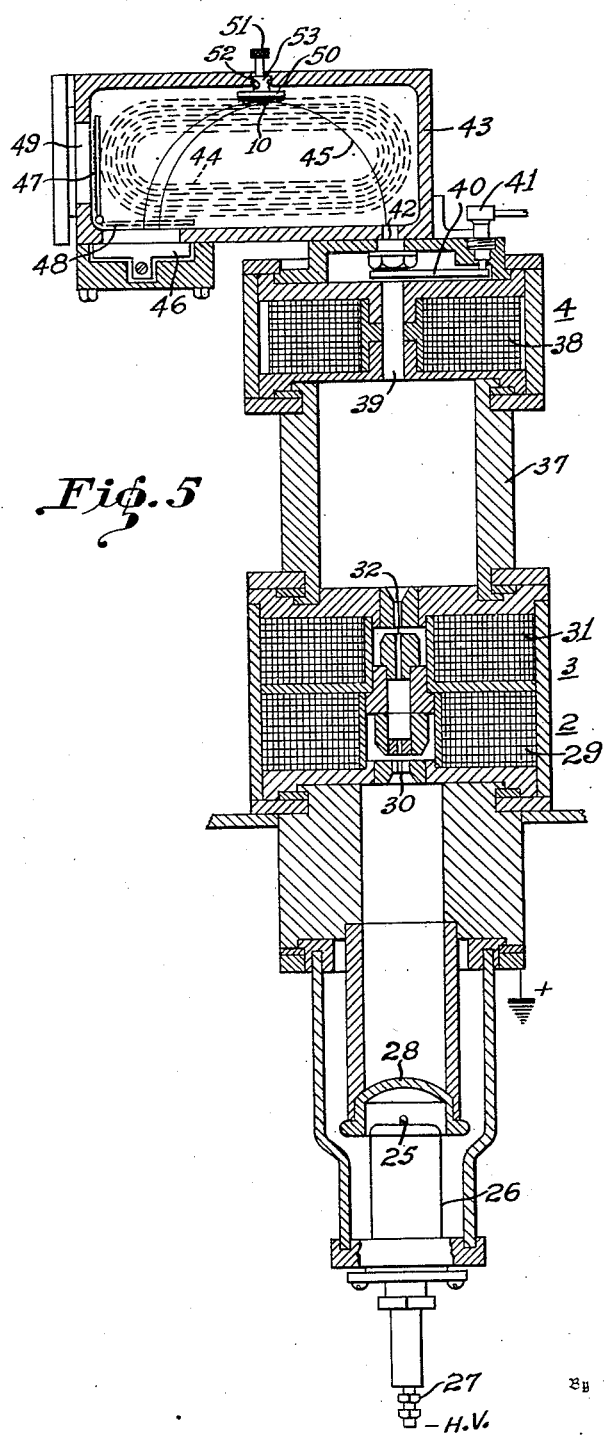

Feb. 3, 1948.   N. R. DAVIDSON   2,435,386
ELECTRON DIFFRACTION CAMERA
Filed July 27, 1946   2 Sheets-Sheet 1
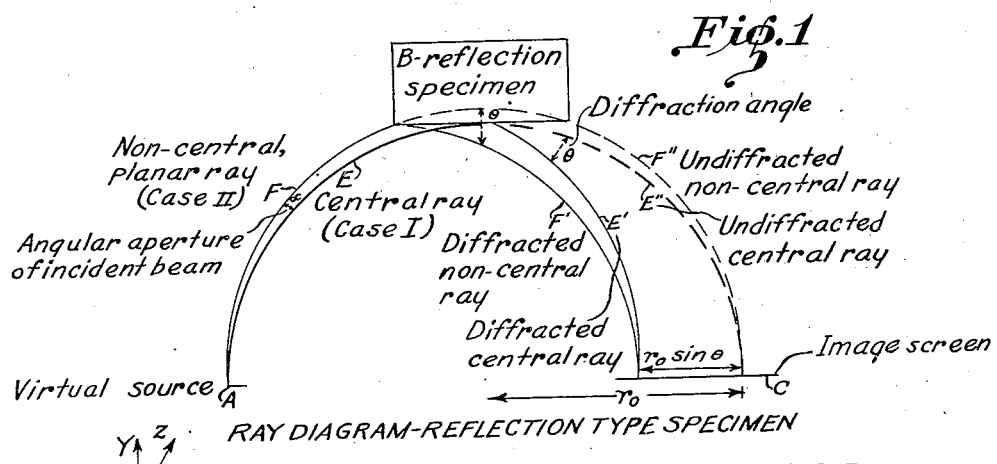
RAY DIAGRAM—REFLECTION TYPE SPECIMEN
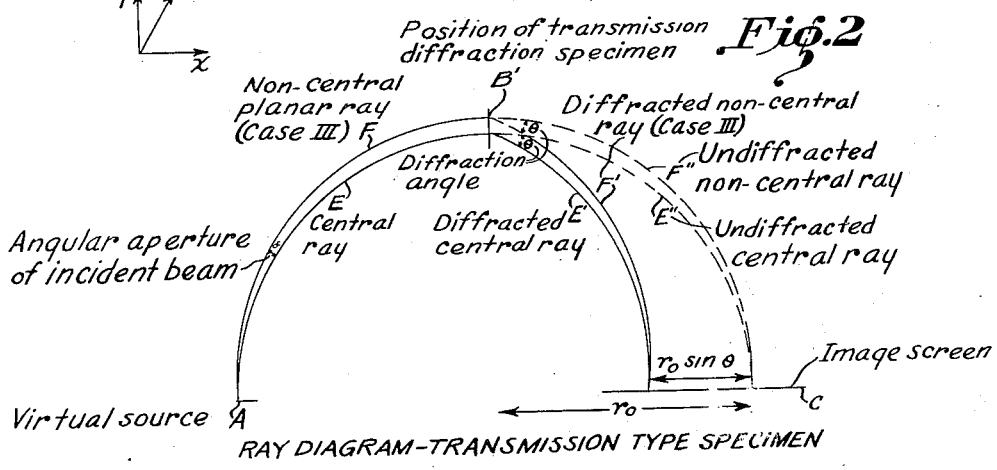
RAY DIAGRAM—TRANSMISSION TYPE SPECIMEN
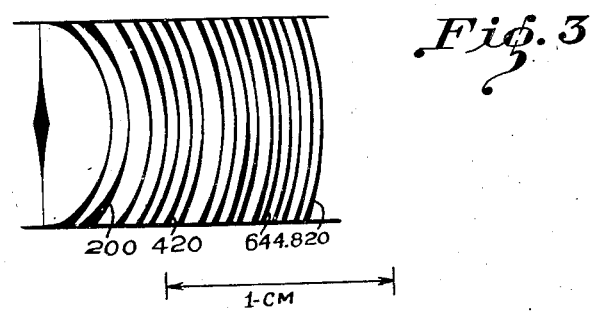
Inventor
NORMAN R. DAVIDSON
Attorney Feb. 3, 1948. N. R. DAVIDSON 2,435,386
ELECTRON DIFFRACTION CAMERA
Filed July 27, 1946 2 Sheets—Sheet 2

Inventor
NORMAN R. DAVIDSON
C. D. Tuska
Attorney

Patented Feb. 3, 1948

2,435,386

UNITED STATES PATENT OFFICE 2,435,386

ELECTRON DIFFRACTION CAMERA

Norman R. Davidson, Princeton, N. J., assignor to Radio Corporation of America, a corporation of Delaware Application July 27, 1946, Serial No. 686,692

17 Claims. (Cl. 250—49.5)

1

This invention relates generally to electron optical systems and more particularly to an improved electron diffraction system employing a specimen in a uniform magnetic or radial electrostatic field wherein a monokinetic electron beam diffracted by the specimen either by reflection or transmission is focused by the cylindrical lens action of the field to provide a focused electron diffraction pattern.

Briefly, the instant invention comprises means for providing a monokinetic electron beam from a virtual source adjacent to the entrance slit or collimating aperture of the drift space of a conventional 180° magnetic spectrograph comprising a uniform magnetic field perpendicular to the paths of the electrons, or of providing a monokinetic electron beam from a virtual source adjacent to the entrance slit to the drift space of a 127° 17' electrostatic spectrograph comprising a radial electric field perpendicular to the electron paths. A microspecimen to be analyzed is placed in the semicircular path of the electron rays in the neighborhood of the 90° position of the electron path in the magnetic field case and at the midpoint of the path in the electrostatic case. For reflection diffraction from a surface of the specimen, the specimen surface is placed in a position approximately tangential to the central portion of the electron beam. For transmission diffraction, the position of a very thin microspecimen is such that the electron beam is transmitted through the specimen. For analyzing the composition of gases, a jet of gas is introduced into the field chamber at a position close to the 90° portion of the semicircular electron path through the uniform magnetic field, or at a position close to the midpoint of the electron path through the radial electrostatic field, and a vacuum is maintained throughout the balance of the electron system.

In all three arrangements, different monokinetic electron rays impinging upon the specimen are diffracted thereby at the same angle and are focused at common points or lines on a photographic or other electron recording screen after traversing an additional 90° of the uniform magnetic field, or an additional 63° 38' of the radial electrostatic field.

The essential feature of any focused electron diffraction pattern is that electron rays emanating from an electron source at slightly differing angles and diffracted by a specimen through the same angle all converge to a common point or line on the electron recording screen, thus providing a sharply focused electron diffraction

2 pattern. Such focusing of electron diffraction phenomena is generally achieved by the employment of conventional electromagnetic or electrostatic lenses. The resolving power of such known systems is determined primarily by the cross-sectional dimensions of the actual or virtual electron source and secondarily by the aberrations of the lens systems. In electron diffraction systems not employing electron beam focusing techniques, the resolution of the electron diffraction pattern is determined by collimation of the electron beam by slits or apertures interposed therein. In such systems the width of a diffraction ring is directly proportional to the size of the apertures or slots which determine the angular divergence of the electron beam.

In electron diffraction systems employing electron focusing lenses or other focusing means, it is possible to irradiate a much larger area of a specimen than is possible in a collimation system providing the same resolution, thus providing much more intense, sharply focused diffraction patterns of a relatively larger portion of the specimen under observation.

In the instant invention a system is provided for obtaining sharply focused electron diffraction patterns either by reflection, or by transmission through thin microspecimens or gases, in which a thin pencil of electron rays traversing a semicircular path in a homogeneous magnetic field is diffracted by the specimen at the 90° position of the semicircular electron path, or in which the thin pencil of electron rays traversing a 127° 17' portion of a circular radial electrostatic field is diffracted by a specimen at the midpoint of the electron path. The homogeneous magnetic or radial electrostatic field operates essentially as a cylindrical lens upon the diffracted electron rays since the rays moving in a plane perpendicular to the field are substantially focused to the same point or line at the image screen. It should be emphasized that the system provides no focusing correction for the velocity component of the incident electron rays in the direction of the magnetic field. Hence collimation at the entrance point to the field is desirable to restrict the angular divergence of the incident electron beam in this direction.

Among the objects of the invention are to provide an improved method of and means for electron diffraction from a specimen. Another object is to provide an improved electron diffraction system employing focusing of diffracted electrons by a radial electrical field. A further object is to provide an improved electron diffraction system comprising a diffraction specimen disposed within a uniform magnetic or radial electrostatic field and subjected to irradiation by a monokinetic electron beam. An additional object of the invention is to provide an improved electron reflection-diffraction system. Another object is to provide an improved electron transmission-diffraction system utilizing a diffraction specimen disposed in a uniform magnetic or radial electrostatic field and subjected to irradiation by a monokinetic electron beam. A further object is to provide an improved electron diffraction system for analyzing gases introduced into a uniform magnetic or radial electrical field and irradiated by a monokinetic electron beam. A still further object is to provide an improved electron diffraction system including a diffraction specimen disposed substantially at a midpoint position in a diffraction chamber having a uniform magnetic or radial electrical field, wherein said specimen is irradiated by a monokinetic electron beam. Another object is to provide selectively operable fluorescent and photographic image screens for the diffracted electrons from said specimens and means for selectively controlling electron irradiation of said specimens and/or said screens.

Figure 4:
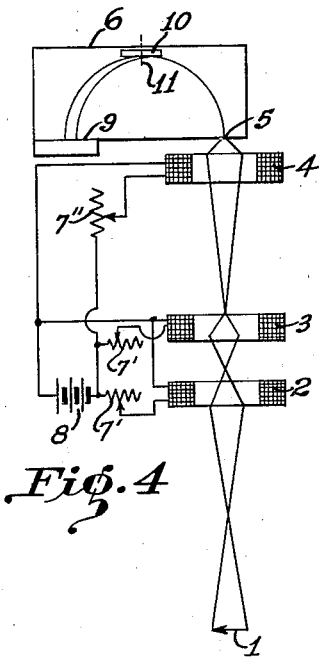
Figure 6:
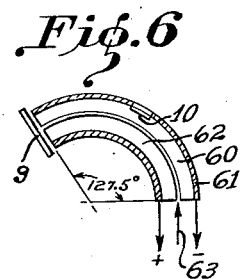

The invention will be described in greater detail by reference to the accompanying drawings of which Figure 1 is an electron ray diagram of the system for a reflection diffraction specimen, Figure 2 is an electron ray diagram of the system for a transmission-diffraction specimen, Figure 3 is a plan view of a typical diffraction pattern according to the invention, Figure 4 is a schematic diagram of a typical electromagnetic embodiment of the complete system according to the invention, Figure 5 is a cross-sectional elevational view of a preferred electromagnetic embodiment of the complete system, and Figure 6 is a fragmentary schematic diagram of an electrostatic modification of the system of Figure 4. Similar reference characters are applied to similar elements throughout the drawings.

A special instance, employed for the sake of simplicity, of the effectiveness of the focusing action of the uniform magnetic field system of electron diffraction is considered. A more general consideration is extremely complex, and is not described herein. Referring to the electron ray diagrams of Figures 1 and 2, in a uniform magnetic field $H_0$, an electron having a velocity $v$ perpendicular to the magnetic field will move in a circular orbit having a radius $$r_0 = \frac{mv}{eH}$$

where $m$ and $e$ are the mass and charge of the electron, respectively. If a magnetic field is considered which is zero for negative values of $y$ and has a value $H = (0, 0, H_0)$ for positive values of $y$ wherein an arbitrary vector $t$ is defined by its three components $(t_x, t_y, t_z)$, central rays scattered in the XY plane may be determined.

*Case I.—Central ray, scattered in XY plane*

The electron of the central ray enters the magnetic field at the point $(-r_0, 0, 0)$ with a velocity $(0, v, 0)$, and if substantially unscattered, it emerges from the field at $(r_0, 0, 0)$. If such an electron is diffracted at $(0, r_0, 0)$ through a small angle $\theta$ so that its velocity components are changed from $(v, 0, 0)$ to $(v \cos \theta, -v \sin \theta, 0)$, the new electron orbit is a circle having its center at $r(-\sin \theta, 1-\cos \theta, 0)$. In order to calculate the point at which the new electron orbit crosses the $x$ axis or impinges upon the electron recording screen, it may be assumed that $\theta \ll 1$ for practical electron diffraction operation, where $\theta$ is expressed in radians. Neglecting powers of $\theta$ greater than $\theta^3$, the position of the diffracted ray is $(r - r \sin \theta, 0, 0)$. Therefore, diffraction of the central ray through an angle $\theta$ in a plane perpendicular to the magnetic field produces a diffraction image displaced by an amount $r \sin \theta$ from the undeviated electron ray.

*Case II.—Non-central ray in XY plane, diffracted by an angle $\theta$ in the XY plane by reflection from a tangential surface at $Y = R_0$*

The non-central ray enters the field at $(-r_0, 0, 0)$ with the velocity components $(-v \sin \alpha, v \cos \alpha, 0)$. The center of the circular orbit is $r_0 (\cos \alpha - 1, \sin \alpha, 0)$. The unscattered ray would return to the recording screen at $(2r_0 \cos \alpha - r_0, 0, 0)$. The displacement from the point $r_0$ for small values of $\alpha$, is $-r_0 \alpha^2$; therefore, the width of the undeviated spot is $r_0 \alpha^2$ for an angular aperture of $\alpha$.

This ray strikes the specimen surface $y = r_0$ at the point $r_0(\cos \alpha - 1 - \sin \phi, \sin \alpha + \cos \phi, 0)$, with $$\sin \phi = \sqrt{2\alpha}\left(1 - \frac{\alpha}{4} - \frac{\alpha}{12}\right)$$

If the ray is diffracted inwards at this point by an angle $\theta$ in the XY plane, the diffracted ray impinges on the electron recording screen at $$r_0 \left[ 2(\cos \alpha - 1) - \sin \theta - \frac{\theta^2 \sqrt{2\alpha}}{2} - \theta \alpha, 0, 0 \right]$$

The deviation from the central spot $(r_0, 0, 0)$ is $$r_0 \sin \theta + 2r_0(1 - \cos \alpha) + r_0 \frac{\theta^2 \sqrt{2\alpha}}{2} + r_0 \theta \alpha$$

The first term of this expression is the position of the diffracted beam for Case I, the second term is the same as the aberration in the undeviated beam, and the third and fourth terms are new and measure the imperfections in focusing introduced by diffraction.

The length of surface exposed to the electron beam is proportional to $\sqrt{\alpha}$ while the width of the diffraction line contains terms proportional to $\alpha^2$, $\theta^2 \sqrt{\alpha}$ and $\theta \alpha$. Therefore, although a large area of surface is bombarded, relatively good focusing is obtained. For example for $\alpha = 10^{-3}$ and $\theta = 3 \times 10^{-2}$ radians with a radius, $r_0 = 10$ cm., the displacement of the diffracted beam will be 0.3 cm., the width of the central spot is $10^{-5}$ cm. (plus the width of the original virtual source at $x = -r_0$ which will in general be greater than this), the width of the diffracted beam will be ca. $3 \times 10^{-4}$ cm. and the length of the region of bombardment is 0.45 cm. For $\alpha = 10^{-2}$, $\theta = 3 \times 10^{-2}$, the width of the central spot is $10^{-3}$ cm., the additional width of the diffracted beam $3 \times 10^{-3}$ cm., and the length of the region of bombardment 1.5 cm.

In general this represents a highly satisfactory focusing for reflection electron diffraction. For example, in order to have a ratio of line width to line displacement of $10^{-3}$ (as in the case for $\alpha = 10^{-3}$), with a length of the region of bombardment of 0.45 cm. a conventional diffraction camera using no lenses would need a specimen to image screen distance of 450 cms.

*Case III.—Non-central ray in XY plane diffracted by an angle $\theta$ in XY plane by transmission type specimen*

The transmission type thin specimen is mounted in the plane $x=0$. The ray that enters the field at $(-r_0, O, O)$ with velocity components $(-v \sin \alpha, v \cos \alpha, O)$, as in Case II, strikes the specimen at $r_0(O, \sin \alpha + \cos \xi, O)$ where $$\sin \xi = 1 - \cos \alpha$$

and the deviation of the diffracted spot from the point $(r_0, O, O)$ is $r_0 \sin \theta + r_0 \alpha^2 - r_0 \theta^2 \alpha$. The focusing is as good as for Case II. The length of specimen bombardment in this case is proportional to $\alpha$.

*Case IV.—Rays in XY plane diffracted to other planes by reflection type specimen*

Considering first the central ray diffracted at the point $(O, r_0, O)$ through a total angle $\theta$ so that its velocity is changed from $(v, O, O)$ to $(v \cos \theta, -v \sin \theta \cos \epsilon, v \sin \theta \sin \epsilon)$ for $-\pi/2 \leq \epsilon \leq \pi/2$, the scattered ray impinges on the electron image recording plane at $$\left(r_0 - r_0 \sin \theta \cos \epsilon - r_0 \frac{\theta^2 \sin^2 \epsilon}{2}, O, \frac{\pi r}{2} \sin \theta \sin \epsilon\right)$$

The shape of the diffraction ring is not a circle but a curve with the parametric equations:

$$\Delta x = r_0 \left(\sin \theta \cos \epsilon + \frac{\theta^2 \sin^2 \epsilon}{2}\right)$$

$$\Delta z = \frac{\pi r_0}{2} \sin \theta \sin \epsilon$$

To determine the focusing for rays scattered out of the plane XY, consider the non-central ray of Case II (initial velocity $$(-v \sin \alpha, v \cos \alpha, O))$$

which impinges on the specimen surface at the point $r_0 (\cos \alpha - 1 - \sin \phi, \sin \alpha + \cos \phi)$ and is scattered directly upwards by an angle $\theta$. This ray intersects the electron recording plane ($y=0$) at the point $$\left[r_0 - r_0\alpha^2 - \frac{r_0\theta^2}{2} - r_0\theta^2\sqrt{\frac{\alpha}{2}}, O, \frac{\pi r_0 \sin \theta}{2}\left(1 + 2\sqrt{\frac{2\alpha}{\pi}}\right)\right]$$

For perfect focusing this point should coincide with the point $$\left(r_0 - r_0 \frac{\theta^2}{2}, O, \frac{\pi r}{2} \sin \theta\right)$$

at which the central ray scattered directly upwards $$\left(\epsilon = \frac{\pi}{2}\right)$$

impinges on the recording screen. The displacement between the two points is $$\left(-r_0\alpha^2 - r_0\theta^2\sqrt{\frac{\alpha}{2}}, O, r_0 \sin \theta \sqrt{2\alpha}\right)$$

The $x$ component of this aberration is not serious, but the $z$ component is rather large. For $\alpha = 10^{-3}$, it is approximately 3 percent of the total displacement of the diffracted ray from the central spot.

*Case V.—Rays not in XY plane*

To indicate the absence of focusing for rays with an initial velocity component in the direction of the field, the special case may be considered of the ray with initial velocity components $(O, v \cos \alpha, v \sin \alpha)$. If this ray does not impinge upon a specimen surface, it returns to the electron-recording screen at $$(2r_0 \cos \alpha - r_0, O, \pi r \tan \alpha)$$

If this ray strikes a specimen surface tangentially in the 90° position and if the ray is diffracted directly downwards and the diffraction angle is $\alpha$, the ray then returns to the recording screen at $(2r_0 \cos \alpha - r_0, O, O)$. This is exactly the point where the undiffracted non-central planar ray strikes the screen. Therefore, there is no focusing in the $z$ direction. If a sharply defined pattern is desired, the angular divergence of the beam in the $z$ direction must be limited by a collimating aperture or other means well known in the art.

A practical realization of the instant technique for obtaining electron diffraction patterns involves the use, for example, of the electron optical system of the "electron microanalyzer" described in the Journal of Applied Physics 15, at pages 663 to 675 (1944). The apparatus described therein consists of a high voltage electron source, a 180° magnetic spectrograph for velocity analysis of electrons transmitted by or reflected from a specimen, and a series of electron lenses for focusing the electron source on an entrance slit of the magnetic spectrograph.

A specimen of magnesium oxide (MgO) smoke collected on a molybdenum surface was mounted tangentially in the 90° position of the electron path of the magnetic spectrograph to provide reflection-diffraction operation. By adjusting the strength of the electron lenses, a virtual electron source of variable angular aperture was formed at the entrance slit of the magnetic spectrograph. By varying the strength of the exciting current of the magnetic spectrograph, the radius of the circular orbits of the electron rays could be varied so as to allow the electron beam to strike at a grazing angle to the fixed magnesium oxide surface. A reflection-diffraction pattern of magnesium oxide smoke obtained in this fashion is illustrated in Figure 3. In this figure the angular aperture of the electron beam is of the order of $4.5 \times 10^{-3}$ radians, corresponding to an area of bombardment of 6.6 mm.$^2$ (assuming the geometry of Case II wherein half of the beam misses the specimen surface). The absence of focusing in the direction of the magnetic field is noticeable in the broadening of the upper and lower ends of the diffraction rings.

Referring to Figure 4, a practical embodiment of the invention utilizing apparatus components as described in said article, and as disclosed and claimed in the copending application of James Hillier, Serial No. 505,572, filed October 8, 1943, provides the required high voltage electron source, electron optical system and electron spectograph merely by changing the position of the specimen in the system. An electron source 1, which may be provided by a conventional thermionic cathode which is maintained at a relatively high negative potential with respect to an apertured anode electrode, neither of which are shown herein, is imaged by three electron lenses 2, 3 and 4 to irradiate the entrance slit 5 of a magnetic spectograph diffraction chamber 6. The electron lenses 2, 3 and 4, respectively, may be of either the electromagnetic or electrostatic types customarily employed in electron optical apparatus such, for example, as in electron microscopes. If electromagnetic lenses are employed as shown in the drawing, the foci of said lenses may be adjusted by means of series resistors 7, 7′, 7″ connected between one terminal of each of the magnetic lenses and an energizing current source, such, for example, as a battery 8.

The strength of the three electron lenses 2, 3 and 4 is adjusted to provide a sharply focused, substantially monokinetic electron beam at the collimating entrance slit 5 of the magnetic diffraction chamber 6. The magnetic field within the chamber 6 will cause the electrons entering through the slit 5 to follow substantially semicircular paths and impinge upon an image screen or photographic plate 9.

The diffraction specimen 10 should be disposed tangentially to the semicircular path of the electrons within the spectographic chamber 6 so that the incident electron beam is grazingly reflected from the surface of the specimen. If desired, the specimen may be disposed normally to the incident electron beam, as shown by the dash line 11, in which case diffraction is accomplished by transmission through the specimen. It should be understood that the electron source, electron optical system and the diffraction chamber 6 all should be evacuated.

It should be understood that the magnetic field within the diffraction chamber 6 may be established in any desired manner. It should also be understood that the electron lens system described may be modified in any known manner to provide a suitable electron beam of convenient cross-sectional area for irradiating the collimating slit 5 of the diffraction chamber, and that the number of electron lenses employed may be varied in accordance with the desired geometrical arrangement of the elements in accordance with known electron optical technique.

Figure 5 is a preferred embodiment of the device described in Figure 4 constructed according to conventional electron microscope practice. The electron source includes a thermionic cathode 25 which is supported by a high potential insulator 26 and connected to a terminal 27 which is maintained at a high negative potential. An apertured anode electrode 28, which is maintained at a high positive potential with respect to the thermionic cathode 25, provides an electron beam having relatively high and relatively uniform electron velocity. The first electron lens 2 is illustrated as a conventional electromagnetic electron microscope lens including a winding 29 and having a pole piece aperture 30. A second electron lens 3 forms a unitary structure with the first electron lens 2 and includes a second winding 31 and a second pole piece aperture 32. A third lens 4 may be similar to the first or second electron lenses 2, 3, and includes a third winding 38 and a relatively large pole piece aperture 39. A shutter 40 operated by an externally controlled knob 41 is interposed between the third electron lens 4 and a collimating aperture 42 in the wall of the magnetic electron diffraction chamber 43 which is secured to the supporting structure of the third electron lens.

A magnetic winding 44 disposed externally of the diffraction chamber 43, provides a magnetic field therein for refracting electrons entering the collimating aperture 42 and for causing them to traverse a semicircular path 45 to impinge upon a photographic plate 46 for providing a permanent record of the electron diffraction pattern. The photographic plate 46 may be removed from the refraction-diffraction chamber 43 by means of an air lock, or any other suitable structure customarily employed in electron microscopes. A hinged fluorescent screen 45, pivoted adjacent one edge of the photographic plate 46 may be rotated to cover the plate 46 for providing a visual image of the diffraction pattern. The visual image on the fluorescent screen when in the horizontal position 48 shown in dash lines, may be observed through a window 49 adjacent to and normal therewith.

The electron diffraction specimen 10 is supported at the 90° position of the electron refraction path 45 by a conventional specimen supporting element 50, which may be adjusted with respect to the electron beam axis by an external adjusting knob 51 operating through an air-tight joint 52 disposed in an aperture 53 in the outer wall of the diffraction chamber 43. A separate door, not shown, may be provided adjacent to the specimen supporting element 50 for removing the specimen from the diffraction chamber, or the window 49 may be removable for this purpose.

Either the rotatable fluorescent screen 47 or the shutter 40, or both, may be utilized for controlling the electron exposure time of the photographic plate 46.

The foci of the electron beam forming lenses 2, 3 and 4 are adjusted to provide the desired electron irradiation of the collimating aperture 42, and the strength of the magnetic field in the diffraction chamber may be controlled, by varying the current through the chamber field winding 44, to provide a sensitive means for adjusting the angle of incidence between the semicircularly refracted electron beam 45 and the specimen surface.

Specific means are not disclosed herein for rotating the specimen to a plane normal to the semicircularly refracted electron beam 45. Any conventional specimen orienting mechanism known in the art may be employed. It should be understood that when the transmission-diffraction system is employed, the specimen should be supported on a thin collodion film in order to minimize the effect of the specimen support, as in transmission electron microscope technique.

Figure 6 shows the radial electrostatic refraction chamber which may be substituted for the uniform magnetic field chamber 6 of the system of Figures 4 and 5. The specimen 10 is supported at the longitudinal midpoint of a coaxial type electrostatic refraction chamber 60 comprising an outer tube 61 and an inner tubular conductor 62. The focused electron beam from the third lens 4 enters the radial electrostatic field of the refraction chamber at a point marked by the arrow 63. The image screen 9 is located at the remote end of the refraction chamber. The overall length of the refraction chamber forms an arc covering an angle of about 127° 17', to provide accurate focusing of the electron beam introduced at the point 63. A radial electric field is provided by a constant potential direct voltage source, not shown, connected between the coaxial electrodes. Location of the specimen adjacent to the inner surface of the outer electrode will minimize field distortion.

Thus the invention disclosed and claimed herein comprises novel methods of and means for providing sharply focused electron refraction patterns of transmission or reflection specimens disposed within uniform magnetic or radial electrostatic fields. A monokinetic electron beam is introduced into the field through a collimating aperture and is refracted therein and focused upon a photographic or fluorescent screen by means of the field focusing action. The specimen is located at substantially the midpoint of the electron refraction path through the focusing field. Aberrations inherent in conventional focusing lenses for focused diffraction cameras are eliminated in the structure disclosed and described herein.

I claim as my invention:

1. The method of employing a monokinetic electron beam and a substantially uniform magnetic or radial electrical field for deriving an electron diffraction pattern of a specimen comprising projecting said beam through said field to refract said beam in an arcuate path, introducing said specimen into said field and into the middle region of said beam path to provide diffraction of electrons of said beam, and imaging said diffracted electrons at the completion of said path to provide a sharply focused electron diffraction pattern of said specimen.

2. The method according to claim 1 including selectively controlling the intensity of electrons in said beam path.

3. The method according to claim 1 wherein said projected electrons are diffracted by said specimen by reflection from the surface thereof.

4. The method according to claim 1 wherein said projected electrons are diffracted by said specimen by transmission therethrough.

5. The method of employing a monokinetic electron beam and a substantially uniform magnetic or radial electrostatic field for deriving an electron diffraction pattern of a gaseous specimen comprising projecting said beam through said field to refract said beam in an arcuate path, introducing a fine jet of said gaseous specimen into said field and into a middle region of said beam path to provide diffraction of electrons of said beam, and imaging said diffracted electrons at the completion of said path to provide a sharply focused electron diffraction pattern of said gaseous specimen.

6. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron image screen for said semicircularly refracted electron rays, and an electron diffraction specimen disposed in the path of said rays at a point in said field adjacent to the 90 degree portion of the ray diffraction path whereby electrons diffracted by said specimen are focused by said field to provide on said image screen a sharply focused electron diffraction pattern of said specimen.

7. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron image screen for said semicircularly refracted electron rays, and means for supporting an electron diffraction specimen disposed in the path of said rays at a point in said field adjacent to the 90 degree portion of the ray diffraction path whereby electrons diffracted by said specimen are focused by said field to provide on said image screen a sharply focused electron diffraction pattern of said specimen.

8. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron image screen for said semicircularly refracted electron rays, and an electron diffraction specimen disposed tangentially to and in the path of said rays at a point in said field adjacent to the 90 degree portion of the ray diffraction path whereby electrons diffracted by reflection by said specimen are focused by said field to provide on said image screen a sharply focused electron diffraction pattern of said specimen.

9. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron image screen for said semicircularly refracted electron rays, and an electron diffraction specimen disposed transversely to and in the path of said rays at a point in said field adjacent to the 90 degree portion of the ray diffraction path whereby electrons diffracted by transmission through said specimen are focused by said field to provide on said image screen a sharply focused electron diffraction pattern of said specimen.

10. An electron diffraction system including a source of monokinetic electron rays, means providing a radial electrical field, means for introducing said electron rays into said field in a direction perpendicular to said field so that rays are refracted by said field through an angle of the order of 127 degrees, an electron image screen for said refracted electron rays, and means for introducing a gaseous specimen into said field in the path of said rays at a longitudinal midpoint of the ray diffraction path whereby electrons diffracted by transmission through said specimen are focused by said field to provide on said image screen a sharply focused electron diffraction pattern of said specimen.

11. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron image screen for said semicircularly refracted electron rays, and an electron diffraction specimen disposed in the path of said rays at substantially the longitudinal midpoint of the ray diffraction path whereby electrons diffracted by said specimen are focused by said field to provide on said image screen a sharply focused electron diffraction pattern of said specimen.

12. An electron diffraction system including a source of monokinetic electron rays, means providing a radial electrostatic field, means for introducing said electron rays into said field in a direction perpendicular to said field so that said rays are refracted by said field through an angle of the order of 127 degrees, an electron image screen for said semicircularly refracted electron rays, and an electron diffraction specimen disposed in the path of said rays at a point in said field adjacent to the 63 degree portion of the ray diffraction path whereby electrons diffracted by said specimen are focused by said field to provide on said image screen a sharply focused electron diffraction pattern of said specimen.

13. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron-sensitive fluorescent image screen for said semicircularly refracted electron rays, and an electron diffraction specimen disposed in the path of said rays at a point in said field adjacent to the 90 degree portion of the ray diffraction path whereby electrons diffracted by said specimen are focused by said field to provide on said image screen a sharply focused electron diffraction pattern of said specimen.

14. An electron diffraction system including a source of monokinetic electron rays, means providing a substantially uniform magnetic field, means for introducing said electron rays into said field in a direction perpendicular to said field so that said rays are refracted by said field through an angle of the order of 180 degrees, an electron-sensitive photographic image screen for said semicircularly refracted electron rays, and an electron diffraction specimen disposed in the path of said rays at a point in said field adjacent to the 90 degree portion of the ray diffraction path whereby electrons diffracted by said specimen are focused by said field to provide on said image screen a sharply focused electron diffraction pattern of said specimen.

15. Apparatus according to claim 14 including a fluorescent image screen, and means for selectively positioning said fluorescent screen in the path of said diffracted electron rays to provide a visual diffraction pattern thereon.

16. Apparatus according to claim 7 including externally adjustable means for orienting said specimen in said field with respect to said introduced electron rays.

17. Apparatus according to claim 7 including an externally operable shutter interposed between said electron source and said screen for controlling the electron exposure time of said screen.

NORMAN R. DAVIDSON.